Figure 1:
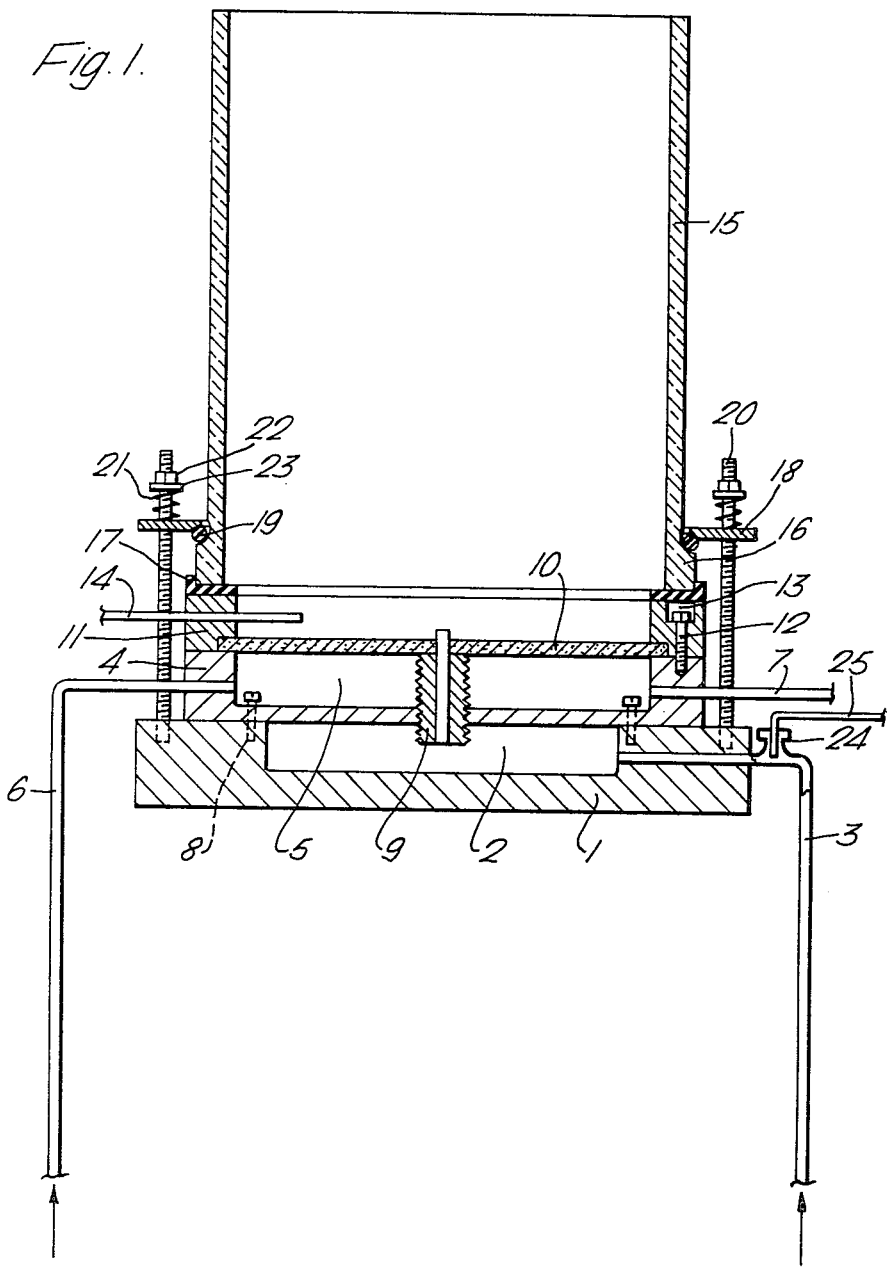

United States Patent [19]

Ford et al.

[11] 4,260,721
[45] Apr. 7, 1981

[54] MODIFIED FLUIDIZED BED

[75] Inventors: Leslie J. Ford, Warrington; Derrick P. Barker, Northwich, both of England

[73] Assignee: Imperial Chemical Industries Limited, London, England

[21] Appl. No.: 72,784

[22] Filed: Sep. 5, 1979

[30] Foreign Application Priority Data

Sep. 6, 1978 [GB] United Kingdom ............... 35814/78

[51] Int. Cl.³ ............................................ C08G 63/26
[52] U.S. Cl. .................................. 528/272; 528/309; 528/480
[58] Field of Search .................. 528/272, 309, 480

[56] References Cited

U.S. PATENT DOCUMENTS

| | | | |
|---|---|---|---|
| 3,117,950 | 1/1964 | Kibler et al. | 528/309 X |
| 3,405,098 | 10/1968 | Heighton et al. | 528/309 |
| 3,585,259 | 6/1971 | Lefferts et al. | 528/309 X |
| 3,756,990 | 9/1973 | Jaeger et al. | 528/309 X |
| 3,767,601 | 10/1973 | Knox | 528/309 X |
| 3,960,817 | 1/1976 | Morawetz et al. | 528/309 |
| 4,161,578 | 7/1979 | Herron | 528/272 |
| 4,161,579 | 7/1979 | Edelman et al. | 525/437 X |
| 4,165,420 | 8/1979 | Rinehart | 528/272 X |

*Primary Examiner*—Lucille M. Phynes
*Attorney, Agent, or Firm*—Cushman, Darby & Cushman

[57] ABSTRACT

A process (and apparatus therefor) for carrying out thermally initiated chemical reactions or physical changes by heating a particulate substrate in a fluidized bed having hotter zone(s) and cooler zone(s) between which the fluidized particles circulate, the dwell time in the cooler zone(s) being sufficiently long to allow chemical reactions(s) or physical change(s) to take place so that when the particles move into the hotter zone(s) the undesirable transformation does not take place, and optionally the dwell time in the hotter zone(s) being sufficiently short so that other undesirable transformation(s) does not take place before the particles move into the cooler zone(s). The fluidized bed process is applicable, for example, to a process for the production of poly(ethylene terephthalate) from terephthalic acid and ethylene oxide.

7 Claims, 5 Drawing Figures

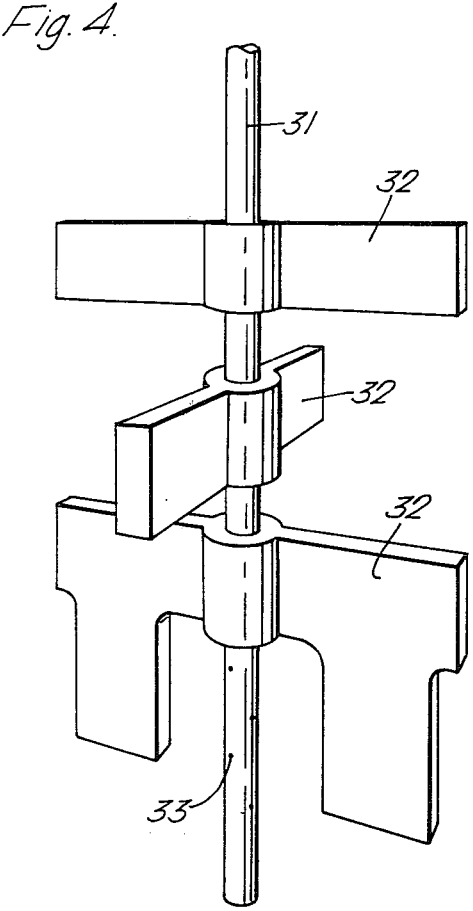

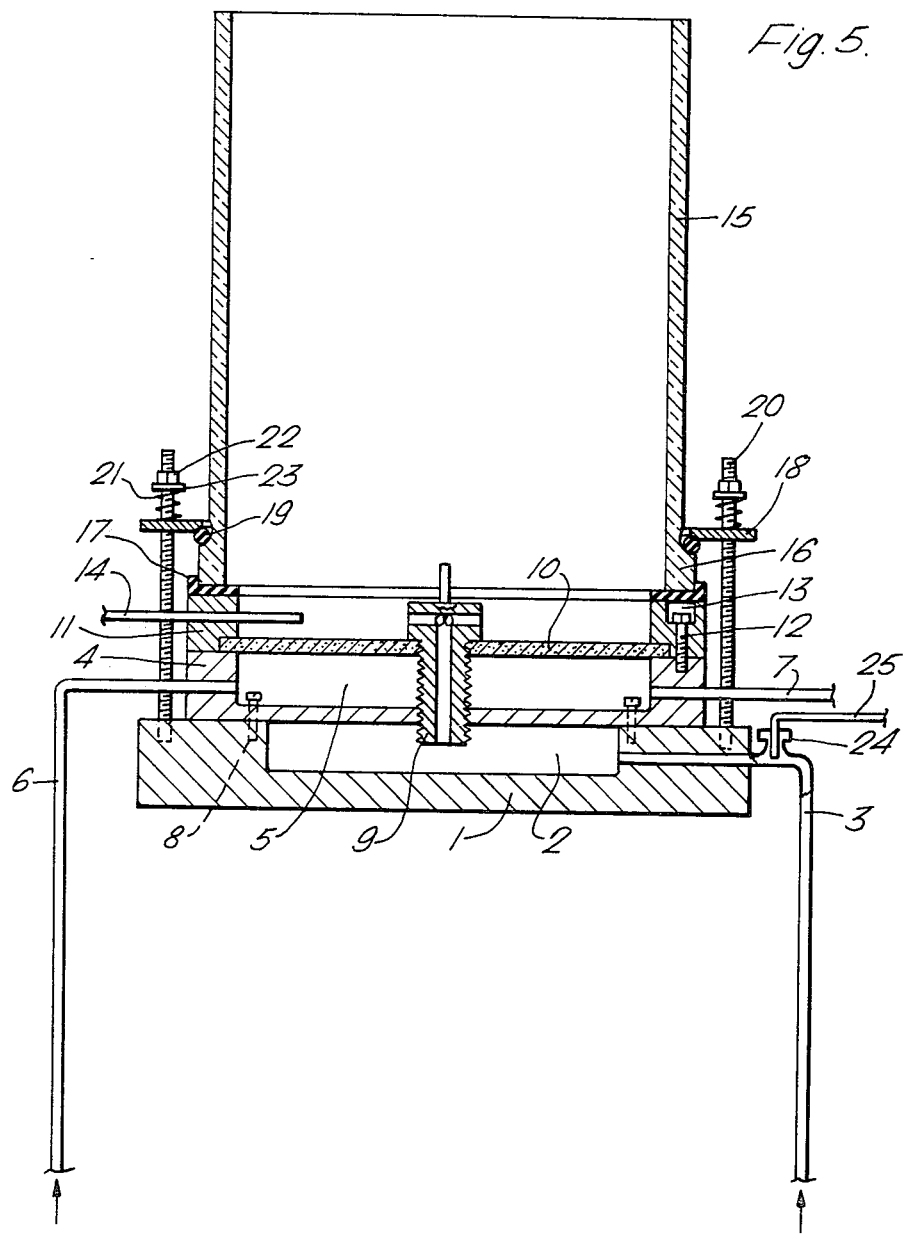

MODIFIED FLUIDIZED BED

This invention relates to a process for causing a material to undergo a chemical reaction or physical change in a fluidised bed, especially when at least one component of the fluidised bed is susceptible to an undesirable thermal transformation.

The type of chemical reactions or physical changes to which this invention is directed are those in which at least one of the reactants or components of the material is in a solid particulate state and the desired chemical reaction or physical change is initiated and/or maintained thermally. It will be appreciated that it is desirable to raise the solid particles to a temperature at which the reaction or physical change proceeds at an acceptable rate, but to avoid the above-mentioned undesirable thermal transformation. However, such transformations, for example, degradation, carbonisation, over-reaction or melting, commonly result from a combination of temperature and time. For example, whereas a material may be able to withstand a certain elevated temperature for a short time, it will undergo the undesirable thermal transformation if it is maintained at that temperature for a longer time. Furthermore, if the undesirable thermal transformation involves melting of the solid particles, this can cause them to stick together, causing so-called "rat-holes" to appear in the bed, and, if agglomeration becomes sufficiently severe, to inhibit fluidisation altogether.

We have now devised a way of conducting chemical reactions or physical changes in a fluidised bed, which minimises or avoids the above-mentioned difficulties.

According to one aspect of our invention, we provide a process for causing a material to undergo one or more thermally-initiated chemical reactions or one or more physical changes in which the material or at least a component thereof is in a solid particulate state and is maintained as a fluidised bed, the fluidising gas being supplied in two or more zones, comprising at least one cooler zone in which the temperature of the gas is below a temperature at which said particulate material is susceptible to an undesirable thermal transformation and at least one hotter zone in which the temperature of the gas is above the temperature at which said particulate material is susceptible to the undesirable thermal transformation, the zones being arranged so that the particles of the bed are constantly moving between them, the dwell time in the hotter zone or zones being sufficiently short so that the undesirable transformation does not take place before the particles move into the cooler zone or zones and/or the dwell time in the cooler zone or zones being sufficiently long to allow chemical reaction(s) or physical change(s) to take place so that when the particles move into the hotter zone or zones the undesirable transformation does not take place, the temperature of the zones being selected so as to cause the chemical reaction(s) or physical change(s) to take place.

The process may be controlled, for example, such that the dwell time in the hotter zone(s) is sufficiently short so that the undesirable thermal transformation does not take place before the particles move into the cooler zone(s), the temperature of at least the hotter zone(s) being sufficiently high to cause chemical reaction(s) or physical change(s) to take place. This mode of operation is especially applicable to processes involving a single thermally-initiated chemical reaction system.

Preferably the cooler fluidising zone(s) is arranged to surround the hotter fluidising zone(s) so that at least some of the particles are borne upwards in the hotter gas and, on reaching the top of the bed, spill over into the surrounding gas where they travel to the bottom of the bed and are later re-entrained in the hotter gas.

However, it will be appreciated that at least some of the particles may be cycled between the zones in other directions, for example, transverse to the bed, if other modes of circulation are superimposed on the fluidised bed circulation, for example by the use of stirred fluidised beds.

Thus, in one embodiment the bed may comprise either a single hotter zone at the centre of the bed or a plurality of such zones spaced about the area of the bed. However, the hotter zones must be sufficiently well separated to provide a comparatively large reservoir of cooler gas around each of them, otherwise the whole bed would quickly attain the temperature of the hotter gas and nullify the desired effect.

Generally, the cross-sectional area of the hotter zone(s) will be smaller than that of the surrounding cooler zone(s) so that the hotter particles are concentrated in a narrower zone or zones. Alternatively, the process may be controlled such that the dwell time in the cooler zone(s) is sufficiently long to allow chemical reaction(s) or physical change(s) to take place so that when the particles move into the hotter zone(s), the undesirable transformation does not take place. This mode of operation is especially applicable to processes comprising one or more reactions occurring at a lower temperature and one or more reactions occurring at a higher temperature, and wherein the melting point of the solid particles comprising the bed is low or lowered at the start of the reaction sequence and increase as the reaction sequence proceeds.

Preferably the hotter fluidising zone(s) is arranged to surround the cooler fluidising zone(s) so that at least some of the particles are borne upwards in the cooler gas and, on reaching the top of the bed spill over into the hotter surrounding gas, where they travel to the bottom of the bed and are later re-entrained in the cooler gas. It will be appreciated that at least some of the particles may be cycled between the zones in other directions, for example transverse to the bed, if, for example, the bed is stirred.

Thus, in another embodiment the bed may comprise either a single cooler zone at the centre of the bed or a plurality of such zones spaced about the area of the bed. However, the cooler zones must be sufficiently well separated to provide a comparatively large reservoir of hotter gas around each of them, otherwise the whole bed would quickly attain the temperature of the cooler gas and nullify the desired effect.

The dwell time of the particles in the hotter zone or zones is critical if the reaction temperature is to be kept high enough to promote fast reaction, but the undesirable thermal transformation is to be avoided, for example in processes involving a single thermally-initiated chemical reaction system. Thus the depth of the bed must be regulated so that it is not so deep that the dwell time is unduly long nor so shallow that the gas "channels" through the bed.

When two or more chemical reaction systems occur at different temperatures, and the melting point of the solid particles is low or lowered at the start of the reaction sequence and increases as reaction proceeds, it is important that the dwell times in the hotter and cooler zones (and hence the volumes required for the hotter and cooler zones) are such as to achieve the desired extent of reaction whilst avoiding undesirable thermal transformation. Thus, the dwell time in the cooler zone(s) may be regulated so that it is sufficiently long to ensure that any initially formed molten or partially molten products undergo further chemical reaction to form solid particulate products having a higher melting point before moving into the hotter zone(s). At the same time, the dwell time in the hotter zone(s) may be regulated to ensure adequate further reaction. It will be appreciated that as the reaction proceeds to give products of increased melting point, the temperature of the cooler zone(s) may also be increased.

Apart from the difference in temperature of the gas supplies, their relative superficial velocities and flow rates must be chosen so that the particles are raised to the required temperature in the hotter gas, but either not kept at that temperature too long and/or the temperature is not raised too quickly. However, the velocities must always be above that required for incipient fluidisation, but the mean velocity over the bed must not, of course, exceed the free falling velocity of the particles, to avoid pneumatic transport of the particles out of the bed.

It will be appreciated that considerable variations in the relative rates of the gas flow, linear velocity and bed depth may be used to achieve our desired effect. However, the optimum values may be simply determined by routine experimentation using procedures well-known in the art, for example as described by Davidson and Harrison in "Fluidised Particles" published by Cambridge University Press 1963.

The solid particulate material is most conveniently heated by controlling the temperature of the gas streams to the hotter and cooler zones. This is preferably achieved by providing separate gas supplies which are heated independently, for example, by passage through heatexchangers. If a chemical reactant is included in the gaseous phase, it may be incorporated in the gas supply to either zone.

It is generally convenient to carry out the process of our invention batchwise, continuing the process until all the particles have undergone the desired chemical or physical change by virtue of recirculation between cooler and hotter zones. However, it is possible to run the process on a continuous basis, for example, using a multi-stage reactor.

According to a further aspect of our invention we provide a fluidised bed apparatus comprising a vessel having a gas-permeable baseplate provided with means whereby a gas may be caused to pass therethrough, at least one nozzle or jet located in the vessel above the baseplate and provided with independent gas-supplying means, each gassupplying means being associated with a heat-exchanger, whereby each gas supply may be heated or cooled independently to a pre-determined temperature.

The gas permeable baseplate may conveniently comprise a sintered metal or glass disc or a metal plate having a multiplicity of small holes, the fluidising gas or gases being supplied over substantially its whole area, e.g. by way of a plenum chamber.

The apparatus may comprise a single vertical jet passing through the centre of the baseplate or there may be several vertical jets spaced about the baseplate. However, when there are several jets they must be sufficiently well-spaced to define separate hotter and cooler zones.

Alternatively the jet or jets may comprise at least one disperser having a plurality of side ports or like means adapted to produce initially substantially horizontal flows of gas within the vessel. The disperser or dispersers may be used in combination with a stirrer or stirrers adapted to rotate within the vessel. The apparatus may suitably comprise a single such disperser passing through the centre of the baseplate or several such dispersers spaced about the baseplates which are sufficiently well spaced to define separate hotter and cooler zones.

The jet or jets may also comprise at least one hollow shafted stirrer located above the baseplate, each stirrer being provided with a plurality of holes adapted to produce initially substantially horizontal and rotating flows of gas. Preferably the holes are located in the stirrer shaft. The apparatus may suitably comprise a single such stirrer located above the centre of the baseplate or several such stirrers spaced about the baseplate which are sufficiently spaced to define separate hotter and cooler zones.

The use of jets in the form of the aforesaid dispersers or hollow shafted stirrers provided with a plurality of holes, has the effect of widening the zone or zones associated with said jets, which is especially useful for increasing the dwell time of particles in a cooler zone or zones surrounded by a hotter zone or zones. The use of stirrers, for example in combination with dispersers, or as a hollow shafted stirrer provided with a plurality of holes, is particularly advantageous when handling solid particulate materials which become strongly cohesive whilst undergoing chemical change(s) or physical change(s) in the bed.

It will be appreciated that a variety of chemical reactions or physical changes may be carried out using our process. For example, a solid material may be heated in an inert gas to a temperature at which a desired chemical reaction occurs; or a solid material may be reacted with a gaseous reactant, which may either be used as, or as a component of, one or both of the gas streams. Alternatively, a temperature-sensitive material may be dried by subjecting it to an inert, heated gas stream.

One particularly suitable process which may be carried out using the process of our invention is the polymerisation of a low molecular weight poly(ethylene terephthalate), that is, raising its molecular weight (as characterised by its intrinsic viscosity, IV) by heating. Poly(ethylene terephthalate) is commonly prepared by reacting high purity terephthalic acid with ethylene glycol in the melt phase at approximately 285° C. Essentially, the reaction proceeds in two stages, the first involving esterification, to produce a mixture of mono- and bis- hydroxyethyl terephthalate and the second involving polycondensation and polyesterification to yield low molecular weight poly(ethylene terephthalate). This last-mentioned product is commonly referred to as a "pre-polymer". This pre-polymer must be further polymerized to raise its IV to the range 0.67 to 1.0 to give a commercially useful polymer. This is achieved by heating the pre-polymer commonly at a temperature of at least 235° C. in the presence of a catalyst.

Since ethylene glycol and water are evolved during this polymerisation process, it is preferred that the solid pre-polymer is in particulate form, to increase its surface area and hence facilitate removal of the ethylene glycol and water. The process may be carried out by heating the prepolymer particles in a stirred vessel; but there is a clear potential advantage in making the particles the solid phase of a fluid bed. The particles could then be heated by means of a heated fluidising gas which would not only cause the polymerisation reaction to take place, but also aid removal of the evolved ethylene glycol or water. However, if a simple fluidised bed is used, that is, one in which the whole of the fluidising gas is raised to a temperature at which the reaction takes place at an acceptable rate, the particles of prepolymer become "sticky", due to surface melting, and agglomerate sufficiently to produce "rateholes" in the bed or even to such an extent that fluidisation is no longer possible.

In contrast to this, we have found that the polymerisation reaction may be carried out in a modified fluidised bed according to our invention with greatly reduced, or even no, agglomeration of the particles and wherein the fluidising gas in the cooler zone(s) is preferably maintained between 205° and 210° C. and the gas in the hotter zone(s) or jet(s) is preferably maintained between 210° and 265° C., for example between 230° and 250° C. In this process an inert gas is used, since it is only required as a heating and fluidising medium. Any inert gas may be used, but nitrogen is generally most convenient.

Another particularly suitable process which may be carried out using the process of our invention is the reaction of solid terephthalic acid with gaseous ethylene oxide to give solid poly(ethylene terephthalate). Such a process is described, for example, in British Patent No. 1,387,335 (Imperial Chemical Industries). The process comprises an initial esterification stage in which a mixture of solid mono- and bis- hydroxyethyl terephthalate is formed and a second polycondensation or polyesterification stage (with more terephthalic acid) to give poly(ethylene terephthalate). The esterification stage may be carried out in the presence of suitable catalysts, for example organic bases such as tertiary amines, tertiary phosphines, quaternary ammonium hydroxides, and quaternary phosphonium hydroxides. An esterification catalyst may be used which is volatile under the conditions of the reaction and is conveniently introduced into the bed with an inert fluidising gas. When a nonvolatile catalyst is used, it is conveniently introduced by incorporating with the solid terephthalic acid. The second stage may be catalysed by polycondensation catalysts, for example compounds of antimony, germanium, tin or titanium, or by polyesterification catalysts such as titanium compounds.

The process is suitably carried out in a fluidised bed reactor, as described in the aforesaid British Pat. No. 1,387,335. The esterification, polyesterification and polycondensation reactions are carried out simultaneously in the bed, for example at a bed temperature within the range 160° to 240° C. so that polymer, esters and terephthalic acid are present at intermediate stages of the process. However, it is difficult to avoid some aggregation of solid particles occurring and we have now found that agglomeration can be reduced if the process is carried out using the modified fluidised bed according to our invention.

The esterification stage is primarily carried out in the inner cooler zone or zones of the bed, for example starting at a temperature about the melting point of the initial ester product (120° C.) and typically increasing from 120° to 180° C. The temperature of the cooler zone(s) is conveniently maintained by controlling the temperature of the jet or jets introducing a fluidising gas mixture of ethylene oxide and an inert gas (for example nitrogen). The polycondensation and polyesterification may start in the cooler zone(s) and stop when the product melting point reaches the temperature of the cooler zone(s). The polycondensation and polyesterification reactions may then continue under thermal control as the particles are transferred from the cooler zone(s) to the hotter zone(s) surrounding said cooler zones. The temperature of the hotter zone(s) is maintained suitably within the range 180° to 210° C., conveniently by controlling the temperature of the fluidising gas (for example an inert gas, such as nitrogen).

It will be appreciated that a temperature gradient may exist both within the cooler zone(s) and within the hotter zone(s) and between said zones; that is, it is unlikely that there is a precise temperature boundary between the zones. Nevertheless, there is an overall difference in the temperature ranges associated with the hotter and cooler zones as mentioned above.

It will also be appreciated that as the process proceeds, the average melting point of the product increases. Accordingly, the process may be controlled by reducing the temperature difference between the cooler zone(s) and the hotter zone(s), conveniently by increasing the temperature of the cooler zone(s), for example up to a temperature equal to that of the hotter zone(s), and finally to a temperature which is greater than that of the initially hotter zone(s), typically within the range 210° to 260° C. It will be appreciated that in the final stages of the process, wherein further polycondensation and/or polyesterification reactions are taking place, the outer cooler zone(s) surround the inner hotter zone(s) in the manner described previously for the further polymerisation of low molecular weight poly(ethylene terephthalate).

Figure 2:
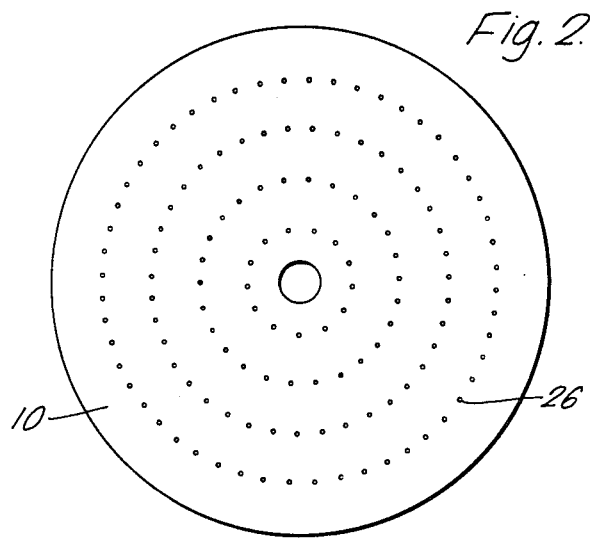
Figure 3:
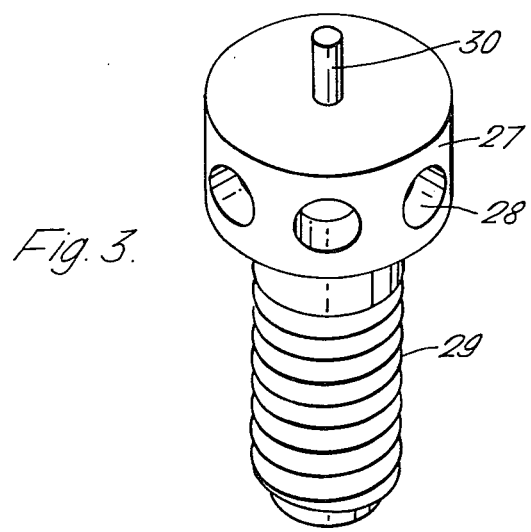

In order that the invention may be clearly understood it will be described by the following Examples with reference to the accompanying drawings in which FIG. 1 is a cross-sectional elevation of an apparatus according to the invention, FIG. 2 is a diagrammatic view of a perforated fluidising bed plate, FIG. 3 is a diagrammatic view of a jet in the form of a disperser, FIG. 4 is a diagrammatic view of a jet in the form of a hollow shafted stirrer provided with holes, which is suitable for use as a combined jet and stirrer, FIG. 5 is a cross-sectional elevation of an apparatus according to the invention incorporating the disperser shown in FIG. 3.

Referring to the apparatus shown in FIG. 1, circular steel plate 1 has a central cavity 2 which communicates with gas feed-pipe 3. A similiarly shaped circular plate 4 has a central cavity 5 which communicates with a second gas feed-pipe 6 and also with pipe 7 which leads to a micromanometer (not shown). Plate 4 is secured to plate 1 by a series of set-screws 8 which pass through holes in plate 4 and screw into tapped holes in plate 1. Externally threaded jet member 9 is screwed into a tapped central hole in plate 4 and is supported thereby. Stainless steel sintered disc 10 rests on the upper edge of plate 4 and is provided with a central hole through which the upper end of jet member 9 protrudes. Alternatively, sintered disc 10 may be replaced by a perforated nickel disc 10' as shown in FIG. 2. Sintered disc 10 is held in place by recessed collar 11 which is secured to the edge of plate 4 by a series of set-screws 12 which pass through countersunk holes 13 in collar 11 and screw into tapped holes in the edge of plate 4. Thermocouple 14 passes through a hole in the wall of collar 11. A thick-walled glass tube 15, provided with a protruding edge 16 at its lower extremity, is supported by collar 11. A gas-tight seal between collar 11 and glass tube 15 is provided by P.T.F.E. gasket 17. Glass tube 15 is clamped in place by encircling flat ring 18 which interacts with protruding edge 16 via gasket 19. Ring 18 is provided with holes to accept the upper ends of threaded rods 20, the lower ends of which screw into tapped holes in the edge of plate 1. The upper ends of rods 20 are provided with springs 21 which are compressed by nuts 22 via washers 23 (Nuts 22 are only screwed down finger tight so that the resilience of springs 21 may obviate undue pressure on edge 16 of tube 15). The end of feed-pipe 6 remote from the apparatus leads to a coiled tube located in an oven (not shown). Pipe 3 is provided with a gas-tight T-piece 24 in which is located thermocouple 25. The end of pipe 3 remote from the apparatus leads to a separate coiled tube located in a second oven (not shown). The sintered disc used was one supplied by Accumatic Engineering Limited, under the Registered Trade Mark "Sintercon", fine grade 3. It had a thickness of 0.100", maximum particle retention of 0.0008–0.0010" and permeability of $7.5 \times 10^{-8}$ cm$^2$. The perforated nickel disc 10' was comprised of four circular rows of holes 26 having 52, 39, 26 and 13 holes respectively, each hole having a diameter of 0.5 mm.

The diameter of the jet 9 was 4 mm and the diameter of the sintered disc 10 or perforated disc 10' was 72 mm.

In use, the particulate material is charged to the vessel defined by the wall of glass tube 15 and sintered disc 10, which acts as a gas-permeable baseplate. Fluidising gas is then supplied through feed-pipe 6, having been heated to the desired temperature by passage through the aforementioned heating coils. The secondary gas to jet 9 is supplied via feed-pipe 3, having been heated by passage through its heating coils. The working temperatures of the two gas supplies are measured by thermocouples 14 and 25, respectively, the pressure of fluidising gas being indicated by the micromanometer. In order to keep the apparatus up to temperature, the whole assembly was enclosed in an oven which was maintained at the temperature of the fluidising gas.

The jet member 9 may be replaced by an externally threaded disperser as shown in FIGS. 3 and 5. The disperser (as shown in FIG. 3) comprises a head 27 carrying a plurality of side ports 28 (for example, 8 holes each of 3 mm diameter) and an externally threaded portion 29. The disperser is screwed into the tapped central hole in plate 4 (FIG. 5) and is supported thereby. The gas to the disperser is supplied by feed-pipe 3 as described above. The disperser is provided with a spigot 30 for attachment to a stirrer (not shown) rotatable by a motor (not shown).

The jet member 9 may be replaced by a combined stirrer and jet member (as shown in FIG. 4), comprising a hollow stirrer shaft 31 carrying stirrer blades 32, said shaft 31 being provided with a plurality of holes 33 (for example, 4 to 8 holes, each of 0.5 mm diameter). The upper portion of stirrer shaft 31 is attached to and rotated by a motor (not shown) and the lower portion of said shaft rotates in a central bearing (not shown) in plate 4. The gas is fed to the lower portion of the shaft (and thereby to the holes) via the feed-pipe 3 as described above.

Polymerisation of low M wt Poly(ethylene terephthalate) General Procedure

The polymerisations were carried out on poly(ethylene terephthalate) pre-polymer produced by the above-mentioned melt phase process. It had an IV of 0.38 and was shown to be 50% crystalline. The material was ground and sieved to yield fractions having particles either having diameters >300 microns or between 150 and 300 microns.

In each experiment, the apparatus was switched on and heated gas passed through both sintered disc (10) and jet (9) until the jet and fluidising (bed) gas streams stabilised at the desired temperature. The charge of pre-polymer (250 g) was then introduced into glass vessel (15) and the gas flows adjusted to the desired levels. This was taken as zero time. Jet and bed temperatures were carefully monitored and maintained at their pre-determined values and small samples of pre-polymer were withdrawn at 30 minute intervals and analysed for IV. The reading on the micromanometer was also monitored, as a fall in pressure indicated the onset of agglomeration or sintering of the particles.

EXAMPLES 1 and 2

Using the above general procedure, experiments were carried out using jet temperatures in the range 235° to 242° C. and bed temperatures in the range 206° to 224° C., the procedure being continued until sintering occurred or until a reasonable increase in IV had been achieved. The pre-polymer had a particle size from 150 to 300µ in Example 1 and >300µ in Example 2. The results are given in Table 1 below.

TABLE 1

| Ex | Gas Flow (liters/min) | | Temp (°C.) | | Sinter | | |
|---|---|---|---|---|---|---|---|
| No | Jet | Bed | Jet | Bed | | Time (min) | IV |
| 1 | 12 | 25 | 236 | 206 | NS | 120 | 0.57 |
| 2 | 12 | 12 | 235 | 206 | NS | 290 | 0.75 |
| C1 | 12 | 12 | 236 | 213 | | 125 | 0.71 |
| C2 | 15 | 30 | 242 | 224 | | 5 | NM |

NS=not sintered NM=not measured It will be seen from the above results that the bed temperature is preferably kept below 210° C. and that smaller particle sizes reduce the polymerisation time. Comparative examples C1 and C2 show the effect of increase of bed temperature. When the procedure was repeated with a simple fluidised bed, it bubbled freely at 200° C. but when the temperature was raised, the bed sintered at 225° C., a temperature well below that of the jet in Examples 1 and 2 above.

EXAMPLES 3–7

The general procedure was again followed, but this time polymerisation was continued until an IV of 0.67 was reached without sintering. In each case the bed temperature was maintained between 205° and 210° C., the jet temperatures ranging from 235° to 265° C. The results are given in Table 2.

TABLE 2

| Ex | Gas Flow (liters/min) | | Jet Temp | Time | Particle Size |
|---|---|---|---|---|---|
| No | Jet | Bed | (°C.) | (mins) | (µ) |
| 3 | 12.0 | 12.0 | 235 | 240 | 150/300 |
| 4 | 4.3 | 4.3 | 246 | 240 | 150/300 |
| 5 | 5.9 | 4.3 | 248 | 210 | 150/300 |
| 6 | 8.0 | 4.3 | 247 | 330 | >300 |

TABLE 2-continued

| Ex No | Gas Flow (liters/min) Jet | Gas Flow (liters/min) Bed | Jet Temp (°C.) | Time (mins) | Particle Size (μ) |
|---|---|---|---|---|---|
| 7 | 8.0 | 4.3 | 265 | 330 | >300 |

It will be seen from the above results that the jet temperature can be raised considerably without sintering occurring, provided that the bed temperature is kept below 210° C. Again, larger particle sizes increase polymerisation time.

Polymerisation of Terephthalic Acid

General Procedure

The polymerisations were carried out on terephthalic acid, particle size 50 to 200 microns, containing 0.175% by weight titanium dicyclopentadienyl dichloride as a polyesterification catalyst and 0.05% by weight antimony trioxide as a polycondensation catalyst together with 0.5% titanium dioxide as opacifier.

In each experiment, a heated nitrogen stream was passed through a disperser (with 8 holes, each of 3 mm diameter) with an attached stirrer rotating at 60–120 revs/min, (Example 8) or through a rotating hollow shafted stirrer (60–120 revs/min) provided with 4 holes each of 0.5 mm diameter in its shaft (Examples 9 and 10), and a heated mixture of triphenyl phosphine (3 mg/l) and nitrogen was passed through a perforated nickel disc 10' until the jet and fluidising (bed) gas streams stabilised at the desired temperatures with the charge of terephthalic acid (400 g) present in the glass vessel 15 and the gas flows adjusted to the desired levels. Zero time was taken when the jet and bed temperatures stabilised, at which time the jet gas was charged to a mixture of ethylene oxide (15% by volume) and nitrogen (85% by volume). Jet and bed temperatures were carefully monitored and gradually increased throughout the polymerisation.

EXAMPLES 8–10

Using the above general procedure, experiments were carried out using jet temperatures in the range 122° to 252° C. and bed temperatures in the range 180° to 210° C. The jet temperatures were maintained for 1–2 hours at the lowest temperature, and then increased linearly over 4–6 hours from the lowest temperature to 180° C., then maintained at 180°–210° C. for about 2 hours, and finally increased over 2–4 hours up to 230°–250° C. The results are shown in Table 3.

TABLE 3

| Ex No | Gas Flow (liters/min) Jet | Gas Flow (liters/min) Bed | Temp (°C.) Jet | Temp (°C.) Bed | Time (hrs) | % Reaction |
|---|---|---|---|---|---|---|
| 8 | 10 | 8 | 146–249 | 180–205 | 13 | 89 |
| 9 | 10 | 8 | 130–252 | 185–210 | 8 | 95 |
| 10 | 10 | 8 | 122–230 | 186–206 | 9 | 93 |

The percentage reaction was determined by measuring the residue after volatilising the terephthalic acid in a thermogravimetic apparatus (TGA).

What we claim is:

1. A process for causing a material to undergo one or more thermally-initiated chemical reactions or one or more physical changes in which the materail or at least a component thereof is in a solid particulate state and is maintained as a fluidised bed, the fluidising gas being supplied in two or more zones comprising at least one cooler zone in which the temperature of the gas is below a temperature at which said particulate material is susceptible to an undesirable thermal transformation and at least one hotter zone in which the temperature of the gas is above the temperature at which said particulate material is susceptible to the undesirable thermal transformation, the zones being arranged so that the particles of the bed are constantly moving between them, the dwell time in the cooler zone or zones being sufficiently long to allow chemical reaction(s) or physical change(s) to take place so that when the particles move into the hotter zone or zones the undesirable transformation does not take place, and optionally the dwell time in the hotter zone or zones being sufficiently short so that other undesirable transformation(s) does not take place before the particles move into the cooler zone or zones, the temperature of the zones being selected so as to cause the chemical reaction(s) or physical change(s) to take place.

2. A process as claimed in claim 1 wherein the hotter fluidising zone(s) is arranged to surround the cooler fluidising zone(s), so that at least some of the particles are borne upwards in the cooler gas, and on reaching the top of the bed, spill over into the hotter surrounding gas, where they travel to the bottom of the bed and are later re-entrained in the cooler gas.

3. A process as claimed in claim 2 wherein the bed comprises either a single cooler zone at the centre of the bed, or a plurality of cooler zones spaced about the area of the bed sufficiently well separated to provide a a comparatively large reservoir of hotter gas around them.

4. A process as claimed in any one of the preceding claims wherein the solid particulate material is heated by controlling the relative temperatures of the streams of gas to the hotter and cooler zones.

5. A process as claimed in claim 4 wherein the streams of gas are provided by separate gas supplies which are heated independently.

6. A process as claimed in any one of claims 1 to 5 wherein the bed material initially comprises solid terephthalic acid, which is reacted with gaseous ethylene oxide to give an ester comprising solid mono- and/or bishydroxyethyl terephthalate, and wherein the ester undergoes polycondensation and/or polyesterification with terephthalic acid to form poly(ethylene terephthalate)

7. A process as claimed in claim 6 wherein the fluidising gas in the cooler zone(s) is increased from 120° to 180° C. whilst the fluidising gas in the hotter zone(s) is maintained between 180° and 210° C. and wherein the fluidising gas in the initially cooler zone(s) is further increased to a temperature within the range 210° to 260° C.

* * * * *